(12) United States Patent
Nishimura et al.

(10) Patent No.: US 11,043,874 B2
(45) Date of Patent: Jun. 22, 2021

(54) MOTOR AND ROBOT

(71) Applicant: Seiko Epson Corporation, Tokyo (JP)

(72) Inventors: Yoshiteru Nishimura, Shiojiri (JP); Hiroshi Makino, Chino (JP)

(73) Assignee: Seiko Epson Corporation

( * ) Notice: Subject to any disclaimer, the term of this patent is extended or adjusted under 35 U.S.C. 154(b) by 318 days.

(21) Appl. No.: 16/190,349

(22) Filed: Nov. 14, 2018

(65) Prior Publication Data

US 2019/0149016 A1 May 16, 2019

(30) Foreign Application Priority Data

Nov. 15, 2017 (JP) .............................. JP2017-219722

(51) Int. Cl.

| H02K 7/102 | (2006.01) |
| B25J 9/00 | (2006.01) |
| H02K 7/08 | (2006.01) |
| H02K 11/22 | (2016.01) |
| H02K 5/173 | (2006.01) |
| H02P 3/04 | (2006.01) |

(52) U.S. Cl.
CPC ............ *H02K 7/102* (2013.01); *B25J 9/0009* (2013.01); *H02K 5/1732* (2013.01); *H02K 7/083* (2013.01); *H02K 11/22* (2016.01); *H02P 3/04* (2013.01); *H02K 2201/18* (2013.01)

(58) Field of Classification Search
CPC ............. H02K 7/10; H02K 7/102; H02P 3/04

USPC ................................ 310/76, 77, 92, 93, 123
See application file for complete search history.

(56) References Cited

U.S. PATENT DOCUMENTS

| 2014/0367967 | A1* | 12/2014 | Ossyra | F03D 7/0224 |
| | | | | 290/44 |
| 2019/0101175 | A1* | 4/2019 | Chandrasekara | G01L 5/28 |
| 2020/0132149 | A1* | 4/2020 | Chandrasekara | H02K 7/102 |

FOREIGN PATENT DOCUMENTS

| JP | H09-023609 A | 1/1997 |
| JP | 464587 B2 | 3/2011 |

* cited by examiner

*Primary Examiner* — Quyen P Leung
*Assistant Examiner* — Minki Chang
(74) *Attorney, Agent, or Firm* — Harness, Dickey & Pierce, P.L.C.

(57) ABSTRACT

In a motor according to an aspect of the invention, a brake includes a first clamp and a second clamp, a member to be clamped disposed between the first clamp and the second clamp, a first fixing member configured to fix the member to be clamped to a shaft, and a driving section configured to bring the first clamp and the second clamp into contact with the member to be clamped. The first clamp includes a first contact section. The second clamp includes a second contact section. A first housing hole is provided in a housing. The driving section includes a power cable drawn out to the outside of the housing via the first housing hole. The first housing hole overlaps the first contact section, the second contact section, the member to be clamped, and the first fixing member in a plan view from a first radial direction.

9 Claims, 9 Drawing Sheets

MOTOR AND ROBOT

BACKGROUND

1. Technical Field

The present invention relates to a motor and a robot.

2. Related Art

There is known a motor including a brake device that brakes rotation of a shaft (see, for example, JP-A-9-23609 (Patent Literature 1)). Patent Literature 1 describes, for example, a motor including an electromagnetic brake as a brake device.

Examples of the brake device explained above include a configuration for clamping a member to be clamped fixed to a shaft by a pair of clamping members to brake rotation of the shaft. In this configuration, when the member to be clamped is fixed to the shaft, it is sometimes necessary to insert adjusting members into gaps between the member to be clamped and the clamping members to adjust the position of the member to be clamped with respect to the clamping members. Therefore, it is necessary to provide, in a housing that houses the brake device, hole sections for inserting the adjusting members.

On the other hand, in the motor explained above, it is also necessary to provide a hole section for drawing out a power cable for supplying electric power to the brake device to the outside of the housing. Therefore, the number of the hole sections provided in the housing increases. Labor and time for manufacturing the housing increase.

SUMMARY

An advantage of some aspects of the invention is to provide a motor including a brake device that needs to perform position adjustment of a member to be clamped with respect to a first clamping member and a second clamping member and having a structure that can reduce labor and time for manufacturing a housing and a robot including such a motor.

An aspect of the invention is directed to a motor including: a rotor including a shaft extending in a predetermined direction; a stator disposed to be opposed to the rotor in a radial direction of the shaft; a brake device capable of braking rotation of the shaft; and a housing configured to house the rotor, the stator, and the brake device. The brake device includes: a first clamping member and a second clamping member disposed side by side in the predetermined direction; a member to be clamped fixed to the shaft, at least a part of the member to be clamped being disposed between the first clamping member and the second clamping member in the predetermined direction; a first fixing member configured to fix the member to be clamped to the shaft; and a driving section configured to move at least one of the first clamping member and the second clamping member in the predetermined direction and capable of switching a state of the brake device to a braking state for braking the rotation of the shaft and a non-braking state for not braking the rotation of the shaft. The first clamping member and the second clamping member respectively include contact sections configured to come into contact with the member to be clamped in the braking state and clamp the member to be clamped in the predetermined direction. The contact sections are opposed to the member to be clamped in the predetermined direction with a gap therebetween in the non-braking state. In the housing, a first housing hole section piercing through a wall section configuring the housing in a first radial direction in the radial direction is provided. The driving section includes a power cable drawn out to an outside of the housing via the first housing hole section. At least a part of the gap between the contact section of the first clamping member and the member to be clamped is opposed to the first housing hole section in the first radial direction in the non-braking state. When a rotating position of the shaft is a predetermined position, the first fixing member is opposed to the first housing hole section in the first radial direction.

In the motor according to the aspect of the invention, at least a part of the gap between the contact section of the first clamping member and the member to be clamped is opposed to the first housing hole section in the first radial direction in the non-braking state. When the rotating position of the shaft is the predetermined position, the first fixing member is opposed to the first housing hole section in the first radial direction. Therefore, in a state in which the first housing hole section is not closed, the gap between the contact section of the first clamping member and the member to be clamped and the first fixing member are exposed to the outside of the housing via the first housing hole section. Consequently, in a state in which the brake device is housed in the housing, an adjusting member can be inserted into the gap and the member to be clamped can be fixed to the shaft by the first fixing member via the first housing hole section. Therefore, the position adjustment of the member to be clamped with respect to the clamping members can be performed.

The power cable of the brake device is drawn out to the outside of the housing via the first housing hole section. That is, it is unnecessary to respectively provide a hole section for performing position adjustment of the brake device and a hole section for drawing out the power cable. Both of the position adjustment of the brake device and the drawing-out of the power cable to the outside of the housing can be performed by providing one first housing hole section. Therefore, the number of hole sections provided in the housing can be reduced. Manufacturing of the housing can be facilitated. Consequently, according to the aspect of the invention, it is possible to obtain the motor including the brake device that needs to perform the position adjustment of the member to be clamped with respect to the first clamping member and the second clamping member and having a structure that can reduce labor and time for manufacturing the housing.

Since the labor and time for manufacturing the housing can be reduced, the manufacturing cost of the motor can be reduced. Since the number of hole sections provided in the housing can be reduced, the strength of the housing can be prevented from decreasing. Since the position adjustment of the brake device is performed, when the brake device is in the non-braking state, the clamping members and the member to be clamped can be prevented from coming into contact. Therefore, the clamping members and the member to be clamped can be prevented from rubbing to be worn in the non-braking state. Therefore, the life of the brake device can be improved and the life of the motor can be improved. The rotation of the motor can be prevented from being hindered in the non-braking state.

The brake device may further include a second fixing member configured to fix the member to be clamped to the shaft. A second housing hole section piercing through the wall section in a second radial direction in the radial direction may be provided in the housing. At least a part of the gap between the contact section of the first clamping member and the member to be clamped may be opposed to the second housing hole section in the second radial direction in the non-braking state. When the rotating position of the shaft is the predetermined position, the second fixing member may be opposed to the second housing hole section in the second radial direction.

With this configuration, the adjusting member can be inserted into the gap via the second housing hole section as well. Consequently, the gap can be adjusted using two adjusting members and the gap can be more stably adjusted. When the rotating position of the shaft is the predetermined position, the second fixing member is opposed to the second housing hole section in the second radial direction. Consequently, it is possible to fix two parts of the member to be clamped with the first fixing member and the second fixing member while keeping the rotating position of the shaft in the predetermined position without changing the rotating position. Therefore, the member to be clamped can be more firmly and easily fixed to the shaft.

The housing may include: a first lid member configured to close a portion other than a portion through which the power cable is inserted in the first housing hole section; and a second lid member configured to close the second housing hole section. The first lid member and the second lid member may have a same shape.

With this configuration, both of the first lid member and the second lid member can be obtained by manufacturing two lid members having one kind of a shape. Therefore, types of components configuring the motor can be prevented from increasing and the manufacturing cost of the motor can be prevented from increasing.

The first radial direction and the second radial direction may be directions orthogonal to each other.

With this configuration, it is easy to separate, to a certain degree in the circumferential direction, a position where the two adjusting members are inserted and a position of the shaft where the member to be clamped is fixed by the fixing members. It is easy to stably perform position adjusting work for the brake device. The member to be clamped can be more stably fixed to the shaft. For example, by setting the motor using a surface on which the housing hole sections are not provided as a setting surface, it is possible to perform, without changing the posture of the motor, the position adjusting work for the brake device via the first housing hole section and the second housing hole section from a direction in which the housing holes are provided. Consequently, the position adjusting work for the brake device via the two housing hole sections can be easily performed.

The housing may include a first lid member configured to close a portion other than a portion through which the power cable is inserted in the first housing hole section. A portion drawn out to the outside of the housing in the power cable may be fixed to the housing by a potting material. The potting material may close the portion through which the power cable is inserted in the first housing hole section.

With this configuration, for example, when the power cable is connected to an external power supply, even if tensile stress is applied to the power cable, the tensile stress can be prevented from being easily transmitted to a portion housed on the inside of the housing in the power cable. Consequently, the power cable can be prevented from being disconnected from the driving section. The potting material closes the portion through which the power cable is inserted in the first housing hole section. Therefore, the first housing hole section through which the power cable is inserted can be accurately closed by the first lid member and the potting material.

The motor may further include: a bearing configured to rotatably support the shaft; and a detecting device configured to detect a rotating position of the rotor. The housing may include a holding section disposed in one direction of the predetermined direction of the stator. The bearing may be held by the holding section. The detecting device may be disposed on the one direction of the holding section. A recessed section opened to another direction of the predetermined direction and housing the bearing and an injection hole section including a first opening section opened to the outside of the housing may be provided in the holding section. An inner surface of the recessed section may include an inner circumferential surface to which an outer circumferential surface of the bearing is fixed via an adhesive. The injection hole section may include a second opening section opened in the inner circumferential surface of the recessed section. The first opening section may be opened in an outward surface in the radial direction in the housing.

With this configuration, for example, even if the adhesive leaks from the first opening section when a part of the adhesive injected between the inner circumferential surface of the recessed section and the outer circumferential surface of the bearing does not harden, the unhardened adhesive leaks in the radially outward direction of the housing rather than in the one direction of the predetermined direction of the housing. Consequently, the unhardened adhesive can be prevented from adhering to the detecting device disposed in the one direction of the predetermined direction of the housing. Therefore, a deficiency such as a failure of the detecting device or deterioration in detection accuracy of the detecting device can be prevented from occurring. It is possible to prevent the adhesion of the adhesive to the detecting device without providing a closing member that closes the injection hole section. Therefore, it is easy to reduce the number of components of the motor.

The injection hole section may linearly extend from an inside toward an outside in the radial direction.

With this configuration, it is easy to provide the injection hole section. It is easy to insert a dispenser into the injection hole section and inject the unhardened adhesive into the injection hole section.

The injection hole section may extend to tilt in a direction located in the one direction from the inside toward the outside in the radial direction.

With this configuration, a dimension in the predetermined direction of the other portion can be set larger than the injection hole section in the holding section. The strength of the holding section is easily increased. Consequently, a component housed in the housing can be stably supported by the holding section from one direction.

A direction in which the first housing hole section is opened may be a same direction as a direction in which the first opening section is opened.

With this configuration, the position adjusting work for the brake device via the first housing hole section and fixing work for the bearing via the injection hole section can be performed from the same direction of the motor. Consequently, these kinds of work can be efficiently performed. Assemblability of the motor can be improved.

A robot according to another aspect of the invention includes the motor.

With the robot according to the aspect of the invention, manufacturing cost can be reduced. Further, the life of the motor can be improved. Therefore, the robot excellent in reliability can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
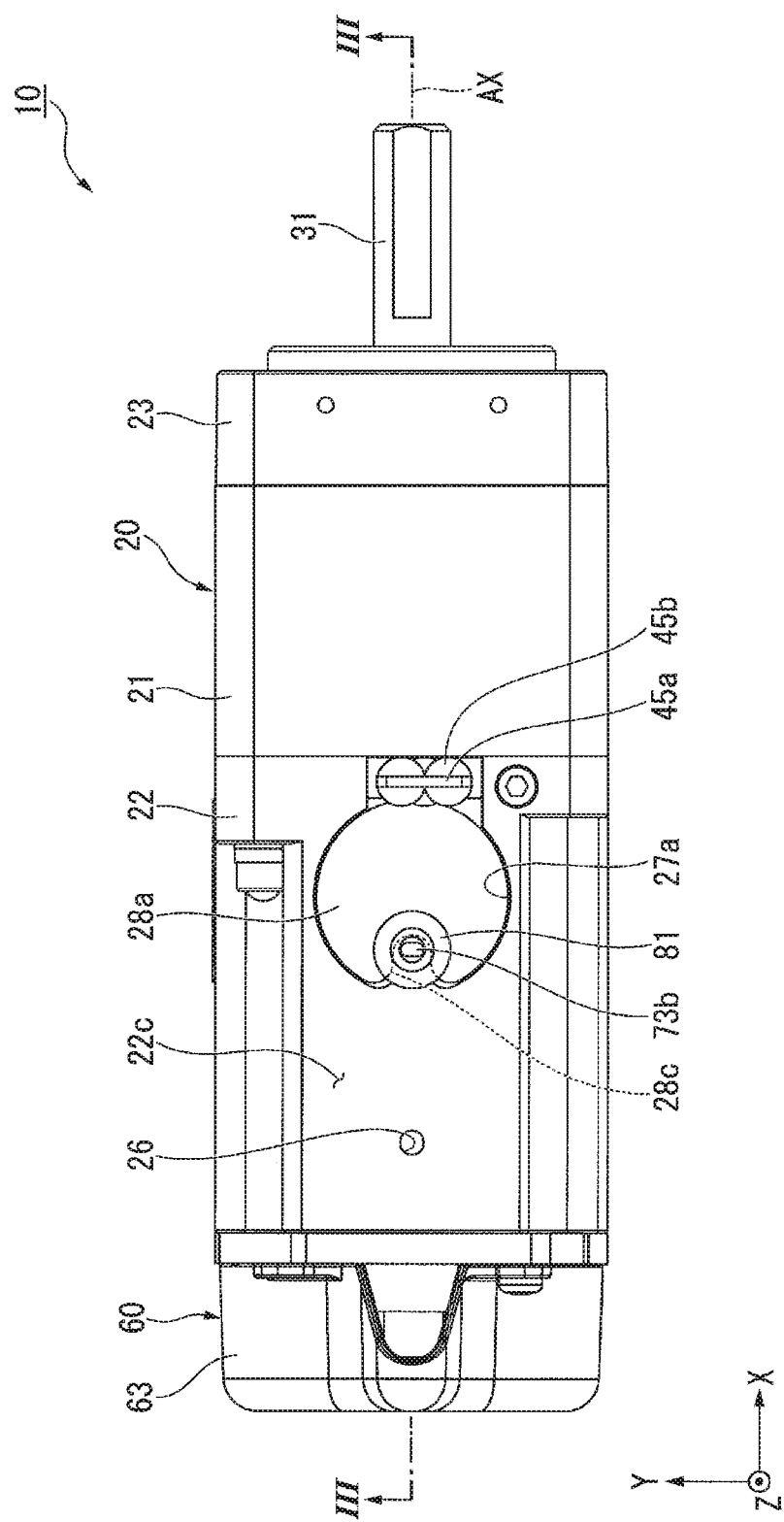
FIG. 1 is a top view of a motor in an embodiment.

A motor and a robot according to an embodiment of the invention is explained below with reference to the drawings.

Note that the scope of the invention is not limited to the embodiment explained below and can be optionally changed within the scope of the technical idea of the invention. In the drawings referred to below, scales, numbers, and the like in structures are sometimes differentiated from those in actual structures to clearly show components.

In an XYZ orthogonal coordinate system shown in the figures, a direction parallel to a Z-axis direction is referred to as "up-down direction", a direction parallel to a Y-axis direction is referred to as "left-right direction", and a direction parallel to an X-axis direction is referred to as "front-rear direction (predetermined direction)". A positive direction of the Z-axis direction (an upward direction in FIG. 3) is referred to as "upward" and a negative direction in the Z-axis direction (a downward direction in FIG. 3) is referred to as "downward". A positive direction in the X-axis direction (a rightward direction in FIG. 1) is referred to as "forward (the other direction of the predetermined direction)" and a negative direction in the X-axis direction (a leftward direction in FIG. 1) is referred to as "rearward (one direction of the predetermined direction)". In the figures, a center axis AX, which is an imaginary axis extending in the front-rear direction, is shown as appropriate. Unless particularly noted otherwise, a radial direction centering on the center axis AX is simply referred to as "radial direction" and a circumferential direction centering on the center axis AX is simply referred to as "circumferential direction".

Note that the up-down direction, the left-right direction, the front-rear direction, the forward, and the rearward are only names for explaining relative positional relations among sections. Actual relative positional relations and postures of the sections may be relative positional relations and postures other than the relative positional relations and the postures indicated by these names.

Motor in the Embodiment

Figure 2:
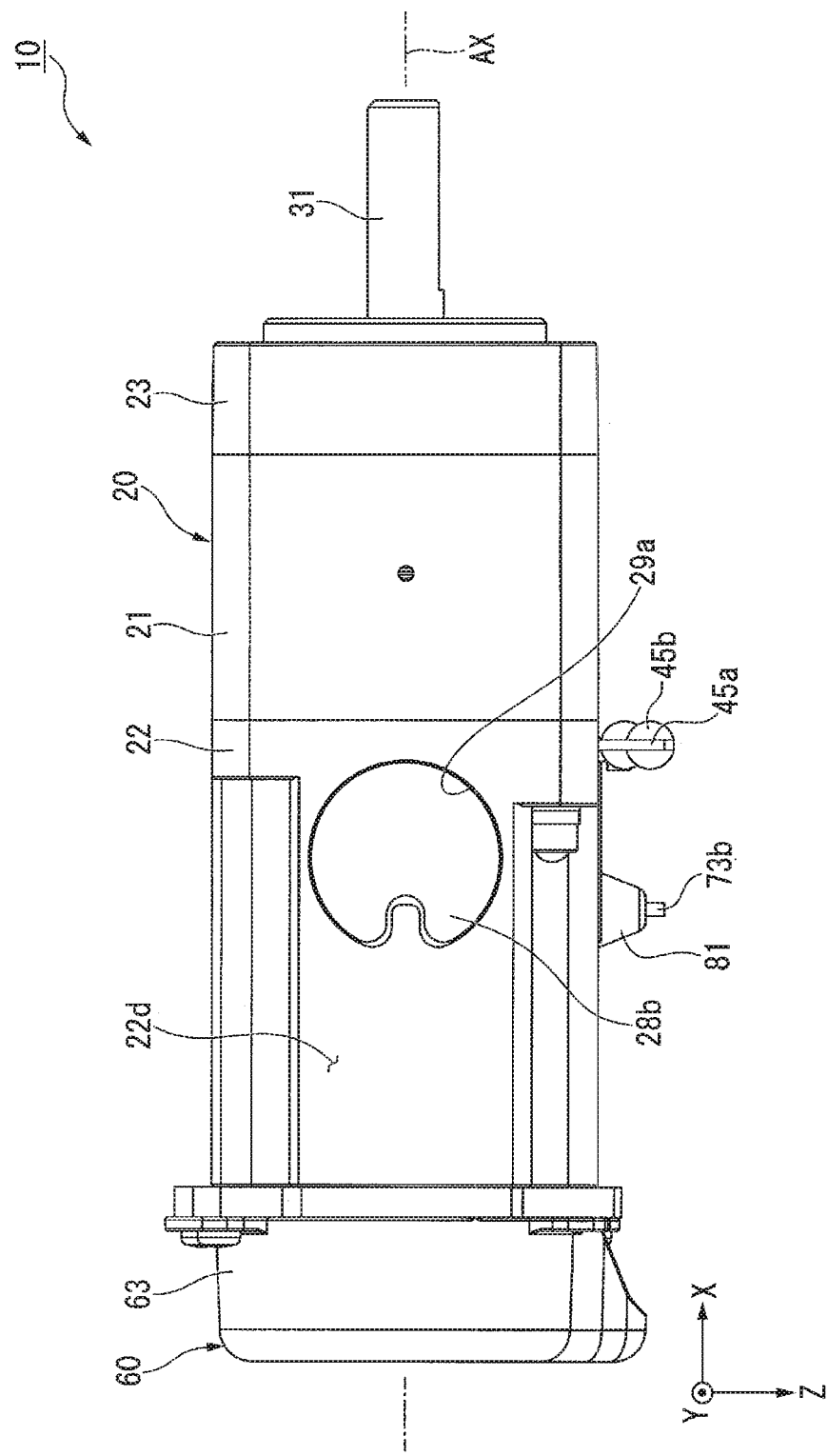
FIG. 2 is a side view of the motor in the embodiment viewed from one direction of the left-right direction.
Figure 3:
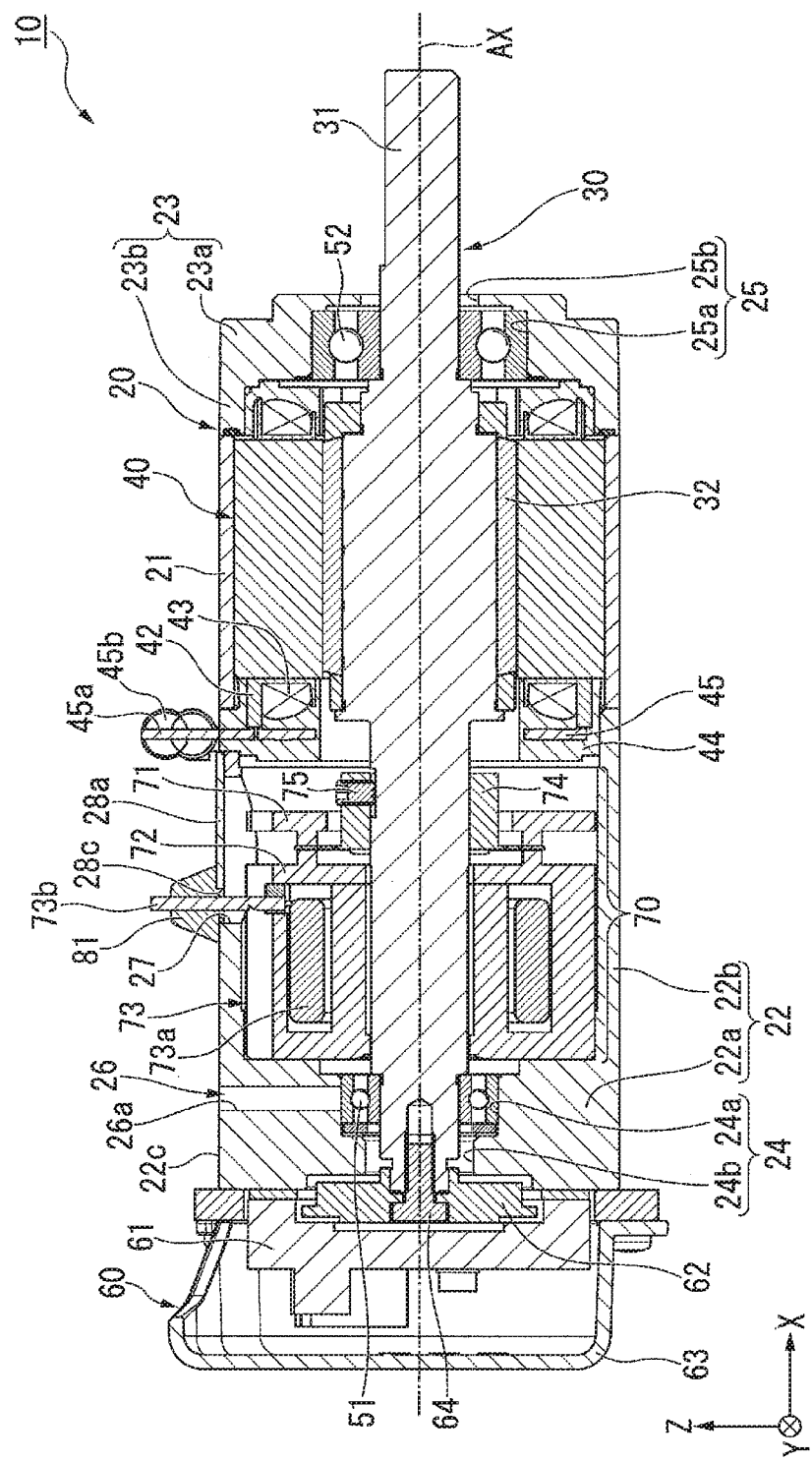
FIG. 3 is a diagram showing the motor in the embodiment and is a III-III sectional view in FIG. 1.
Figure 4:
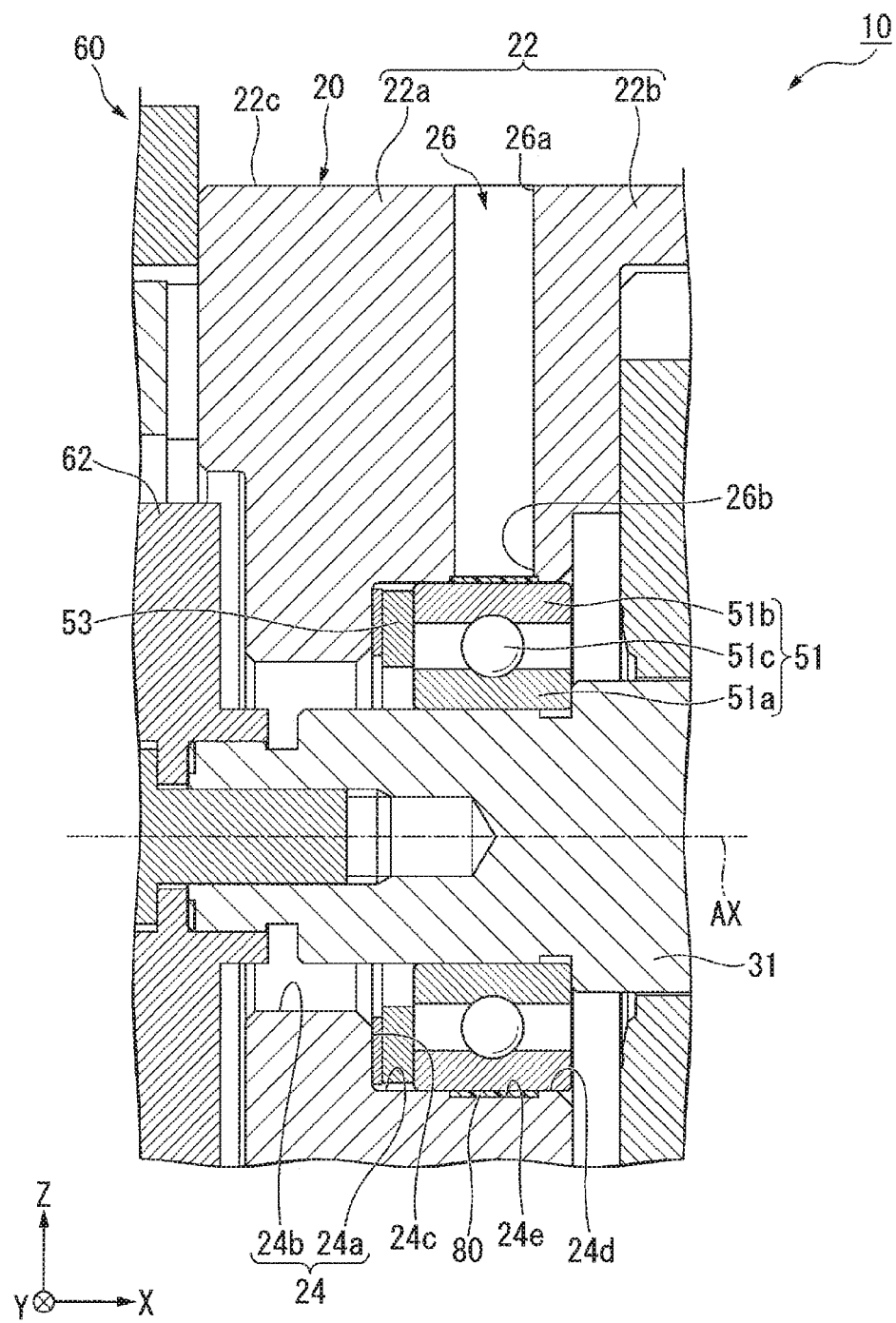
FIG. 4 is a sectional view of a part of the motor in the embodiment.
Figure 5:
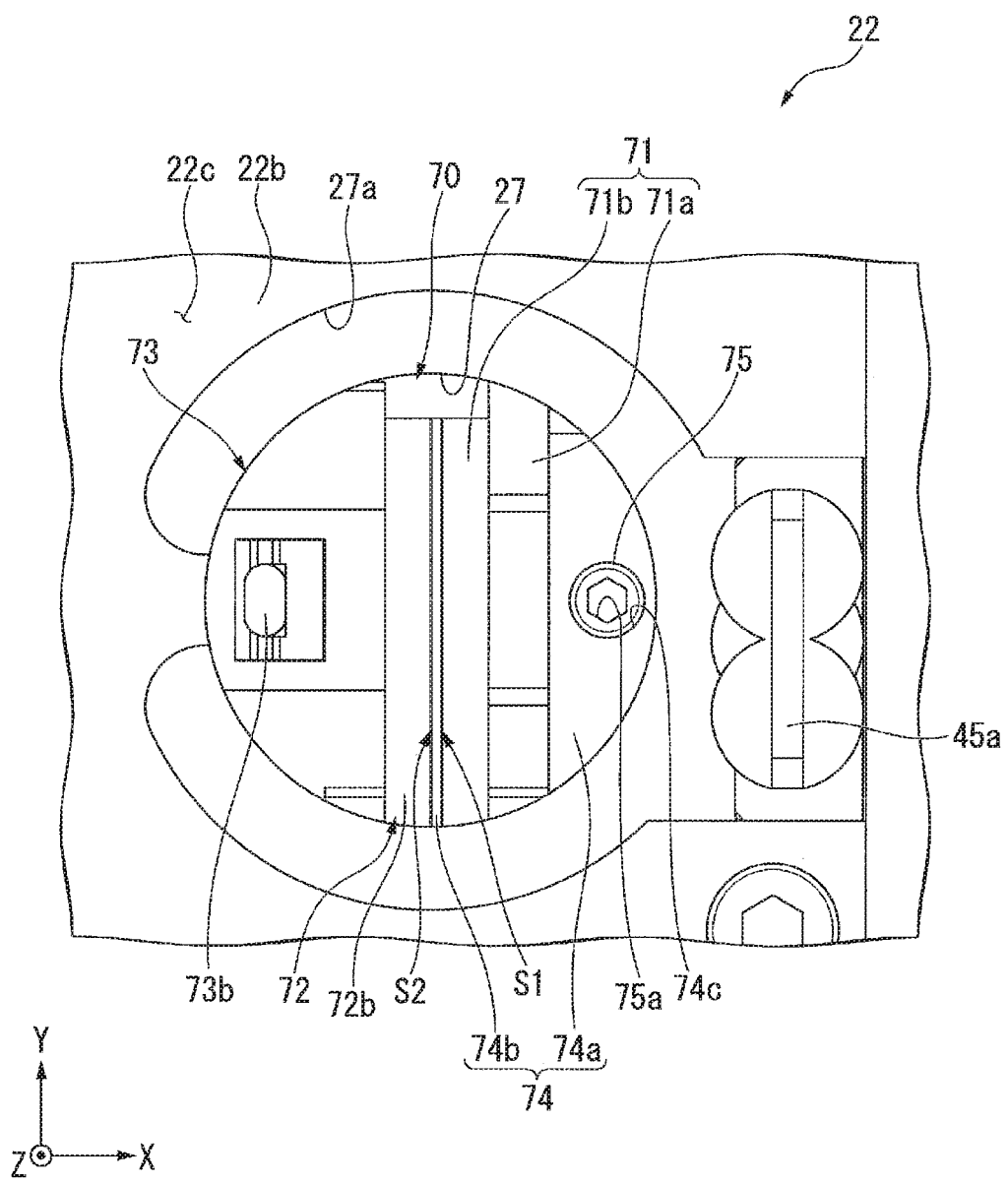
FIG. 5 is a top view of a part of the motor in the embodiment.
Figure 6:
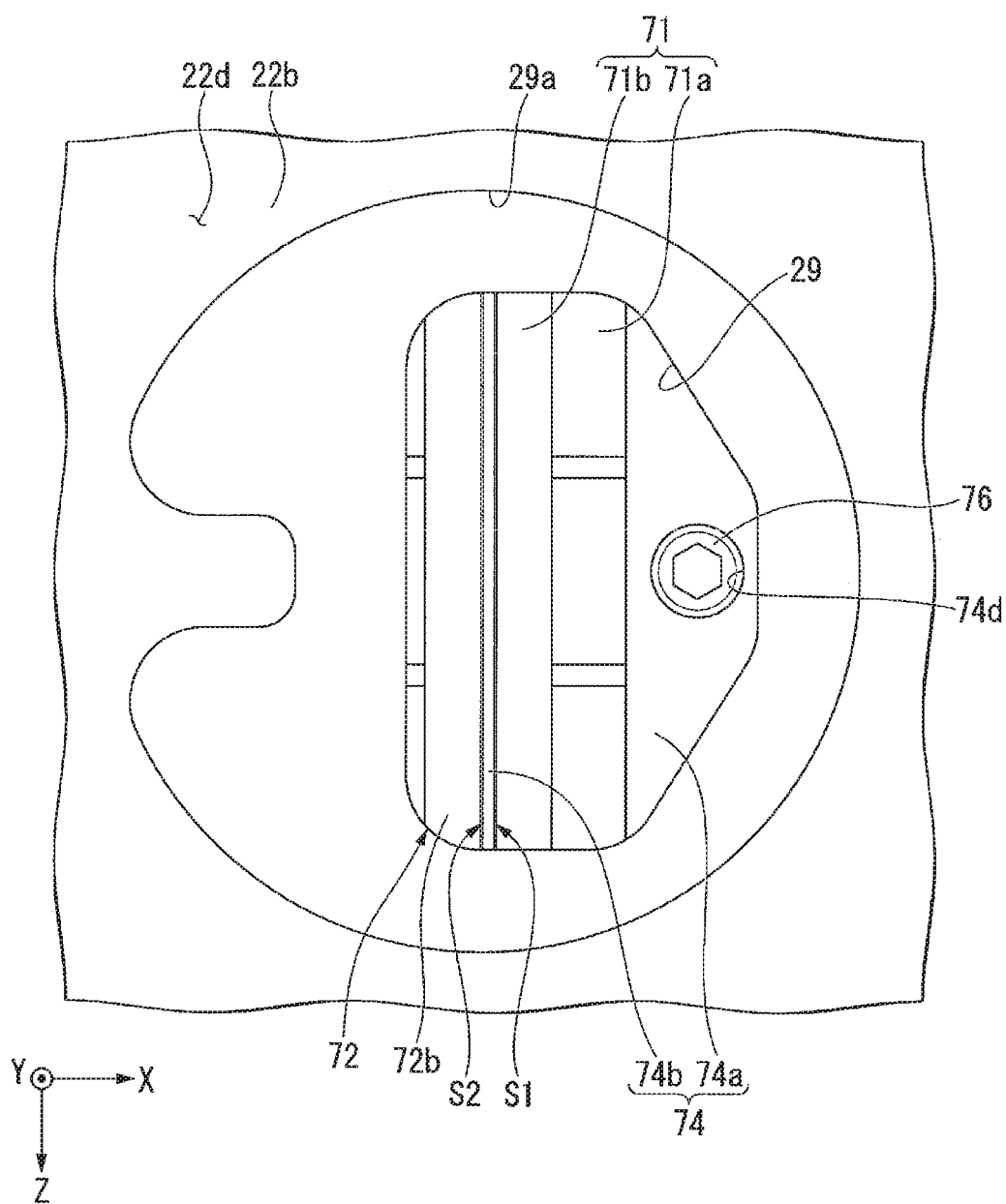
FIG. 6 is a side view of a part of the motor in the embodiment viewed from one direction of the left-right direction.
Figure 7:
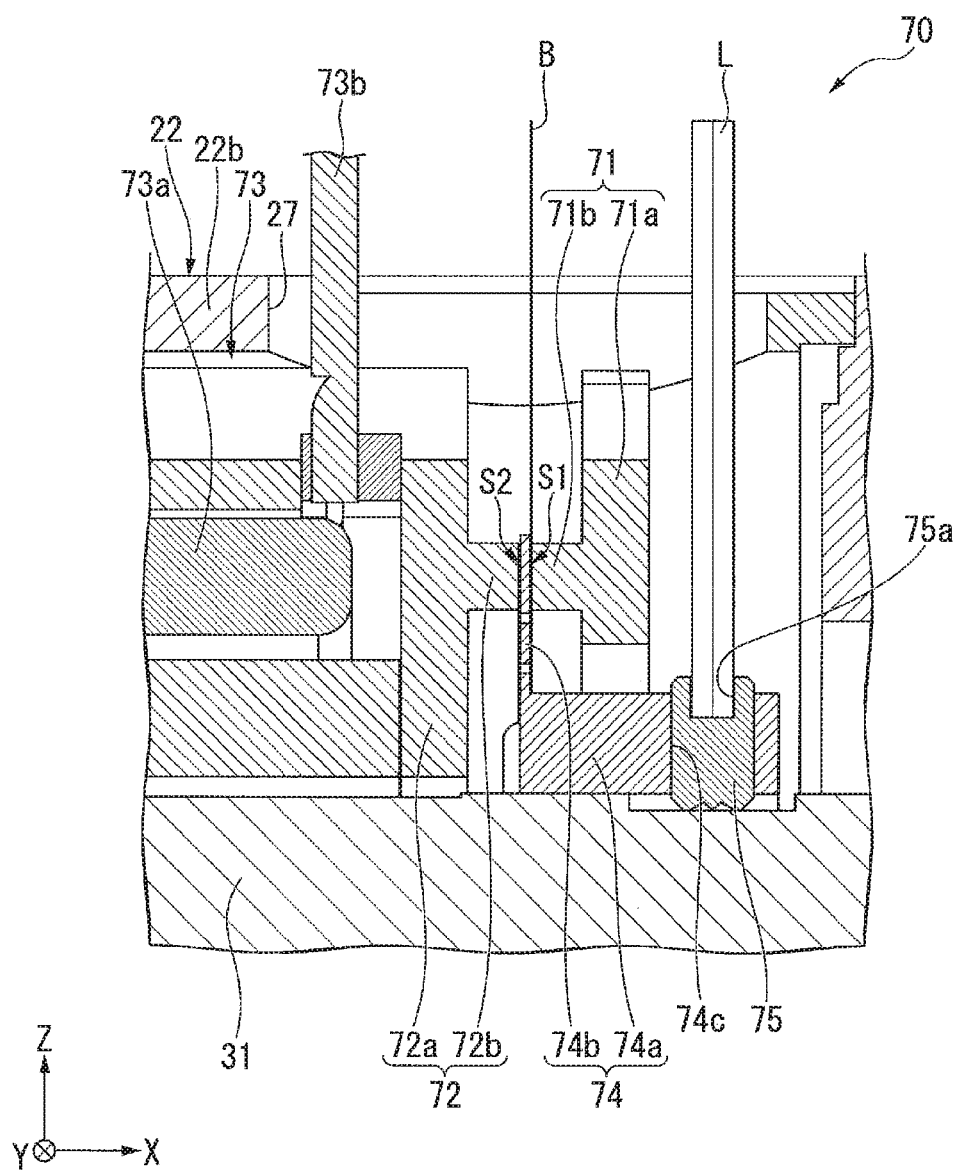
FIG. 7 is a sectional view of a part of the motor in the embodiment.

FIG. 1 is a top view of a motor 10 in this embodiment. FIG. 2 is a side view of the motor 10 in the embodiment viewed from one direction (a +Y direction) of the left-right direction. FIG. 3 is a diagram showing the motor 10 in the embodiment and is a III-III sectional view in FIG. 1. FIG. 4 is a sectional view of a part of the motor 10 in the embodiment. FIG. 5 is a top view of a part of the motor 10 in the embodiment. FIG. 6 is a side view of a part of the motor 10 in the embodiment viewed from one direction of the left-right direction. FIG. 7 is a sectional view of a part of the motor 10 in the embodiment. In FIGS. 5 to 7, a state before a first lid member 28a and a second lid member 28b explained below are fixed is shown.

The motor 10 includes, as shown in FIGS. 1 to 3, a housing 20, a rotor 30 including a shaft 31 extending in the front-rear direction, a stator 40, a mold section 44, a circuit board 45, bearings 51 and 52, a detecting device (a detector) 60, and a brake device 70.

The housing 20 has a square cylindrical shape extending in the front-rear direction centering on the center axis AX. An outward surface of housing 20 includes a pair of side surfaces parallel to the up-down direction and extending in the front-rear direction and a pair of side surfaces parallel to the left-right direction and extending in the front-rear direction. The housing 20 houses, as shown in FIG. 3, the rotor 30, the bearings 51 and 52, the stator 40, and the brake device 70 on the inside. In this embodiment, the housing 20 includes a first housing 21, a second housing (a holder) 22, and a third housing 23. The first housing 21, the second housing 22, and the third housing 23 are members separate from one another.

The first housing 21 has a square cylindrical shape opened to both directions of the front-rear direction. The inner circumferential surface of the first housing 21 has a cylindrical shape centering on the center axis AX.

The second housing 22 is fixed to the rear of the first housing 21. The second housing 22 is disposed behind the stator 40. The second housing 22 includes a rear lid section (a rear lid) 22a and a rear cylinder section 22b. The rear lid section 22a covers the rear of the stator 40. The external shape of the rear lid section 22a is, for example, a rounded square shape when viewed along the front-rear direction.

In the rear lid section 22a, a rear through-hole 24 piercing through the rear lid section 22a in the front-rear direction is formed. The rear end portion of the shaft 31 is inserted through the rear through-hole 24. The rear through-hole 24 is formed by connecting a rear housing recessed section (a recess) 24a and a rear insert-through hole section (a rear insert-through hole) 24b in the front-rear direction. The rear housing recessed section 24a is a recessed section recessed rearward from a front surface of the rear lid section 22a. The rear housing recessed section 24a is opened forward and houses the bearing 51. The inner surface of the rear housing recessed section 24a includes, as shown in FIG. 4, a bottom surface 24c and an inner circumferential surface 24d.

The bottom surface 24c is a surface orthogonal to the front-rear direction and facing forward. The bottom surface 24c has an annular shape centering on the center axis AX. The bottom surface 24c supports the bearing 51 from the rear via a web washer 53 explained below. The inner circumferential surface 24d extends forward from the outer circumferential edge portion of the bottom surface 24c. The inner circumferential surface 24d is a cylindrical surface orthogonal to the radial direction. A groove 24e is formed on the inner circumferential surface 24d. Although illustration is omitted, the groove 24e has an annular shape centering on the center axis AX. The groove 24e is provided in a position opposed to the bearing 51 in the radial direction.

The rear insert-through hole section 24b pierces through the bottom surface 24c to the rear surface of the rear lid section 22a. The rear insert-through hole section 24b centers on the center axis AX. The inner diameter of the rear insert-through hole section 24b is smaller than the inner diameter of the rear housing recessed section 24a.

In the rear lid section 22a, an injection hole section (an injection hole) 26 recessed to the radially inward direction from the surface in the radially outward direction of the rear lid section 22a is formed. In this embodiment, the injection hole section 26 is recessed downward from an upper surface 22c of the second housing 22. The upper surface 22c of the second housing 22 includes the upper surface of the rear lid section 22a and the upper surface of the rear cylinder section 22b. The injection hole section 26 linearly extends from the inside toward the outside in the radial direction. In this embodiment, a direction in which the injection hole section 26 extends is one direction in the radial direction and is the up-down direction.

The injection hole section 26 is disposed in the radially outward direction of the bearing 51. The injection hole section 26 includes a first opening section (a first opening) 26a and a second opening section (a second opening) 26b. The first opening section 26a is opened in the outward surface in the radial direction in the rear lid section 22a (the outward surface in the radial direction in the housing 20, the upper surface 22c). Consequently, the first opening section 26a is opened to the outside of the housing 20.

The second opening section 26b is opened in the inner circumferential surface 24d of the rear housing recessed section 24a. Consequently, the second opening section 26b is opened to the inside of the rear housing recessed section 24a. The second opening section 26b is connected to the groove 24e. The first opening section 26a and the second opening section 26b are disposed in the same position in the front-rear direction. The injection hole section 26 causes the inside of the rear housing recessed section 24a and the outside of the housing 20 to communicate. The injection hole section 26 is a circular hole.

The size of the injection hole section 26 is a size enough for inserting a dispenser for injecting an unhardened adhesive 80 explained below into the groove 24e. In this embodiment, the inner diameter of the injection hole section 26 is smaller than the dimension in the front-rear direction of the bearing 51 and the dimension in the front-rear direction of the groove 24e. As the inner diameter of the injection hole section 26 is larger, it is easier to form the injection hole section 26. On the other hand, when an adhesive 80 is anaerobic, as the inner diameter of the injection hole section 26 is smaller, the adhesive 80 injected into the groove 24e less easily comes into contact with the atmosphere in the injection hole section 26 and more easily hardens. Therefore, the inner diameter of the injection hole section 26 is desirably set small within a range in which the dispenser for injecting the adhesive 80 can be inserted and a size for easy formation can be secured to a certain degree.

As shown in FIG. 3, the rear cylinder section 22b projects forward from the outer circumferential edge portion of the rear lid section 22a. The front end portion of the rear cylinder section 22b is in contact with the rear end portion of the first housing 21. In the rear cylinder section 22b, a first housing hole section 27 piercing through a wall section configuring the rear cylinder section 22b in a direction parallel to the up-down direction (a first radial direction) in the radial direction is formed. The first housing hole section 27 is opened in the upper surface 22c. In this embodiment, a direction in which the first housing hole section 27 is opened is an upward direction and is the same direction as the direction in which the first opening section 26a in the injection hole section 26 is opened. The first housing hole section 27 is a circular hole as shown in FIG. 5.

In this embodiment, the first housing hole section 27 overlaps a part of a first clamping member (a first clamp) 71, a part of a second clamping member (a second clamp) 72, a part of a member to be clamped 74, a part of a driving section 73, and a first screw member 75 explained below in the brake device 70 when viewed along the direction in which the first housing hole section 27 pierces through the wall section of the rear cylinder section 22b (the first radial direction). A power cable 73b explained below is included in a part of the driving section 73.

A groove for fixing 27a is formed in the circumferential edge portion of the first housing hole section 27 on the upper surface of the rear cylinder section 22b (the upper surface 22c of the second housing 22). The groove for fixing 27a extends in a C shape opened rearward when viewed from above.

In the rear cylinder section 22b, as shown in FIG. 6, a second housing hole section 29 piercing through the wall section configuring the rear cylinder section 22b in a direction parallel to the left-right direction (a second radial direction) in the radial direction is formed. The second housing hole section 29 is opened in a side surface 22d in one direction in the left-right direction (a +Y direction) of the second housing 22. In this embodiment, the side surface 22d of the second housing 22 includes a surface in one direction of the left-right direction of the rear lid section 22a and a surface in one direction of the left-right direction of the rear cylinder section 22b.

The second housing hole section 29 is a rounded hexagonal hole. An opening area of the second housing hole section 29 is smaller than an opening area of the first housing hole section 27. In this embodiment, the direction in which the first housing hole section 27 pierces through the wall section of the rear cylinder section 22b (the first radial direction) and the direction in which the second housing hole section 29 pierces through the wall section of the rear cylinder section 22b (the second radial direction) are directions orthogonal to each other.

In this embodiment, the second housing hole section 29 overlaps a part of a first clamping member 71, a part of a second clamping member 72, a part of a member to be clamped 74, and a second screw member 76 explained below in the brake device 70 when viewed along the direction in which the second housing hole section 29 pierces through the wall section of the rear cylinder section 22b (the second radial direction).

A groove for fixing 29a is formed in the circumferential edge portion of the second housing hole section 29 on the side surface in the one direction in the left-right direction (the +Y direction) of the rear cylinder section 22b (the side surface 22d of the second housing 22). The groove for fixing 29a extends in an annular shape surrounding the second housing hole section 29 when viewed from the one direction in the left-right direction. The shape of the outer edge of the groove for fixing 29a is substantially the same as the shape of the outer edge of the groove for fixing 27a formed in the circumferential edge portion of the first housing hole section 27.

As shown in FIG. 3, the third housing 23 is fixed to the front of the first housing 21. The third housing 23 is disposed in the front of the stator 40. The third housing 23 includes a front lid section (a front lid) 23a and a front cylinder section 23b. The front lid section 23a covers the front of the stator 40. The external shape of the front lid section 23a is a rounded square shape like the rear lid section 22a when viewed along the front-rear direction.

In the front lid section 23a, a front through-hole 25 piercing through the front lid section 23a in the front-rear direction is formed. The front end portion of the shaft 31 is inserted through the front through-hole 25. The front through-hole 25 is formed by connecting a front housing recessed section (a front housing recess) 25a and a front insert-through hole section 25b in the front-rear direction. The front housing recessed section 25a is a recessed section recessed forward from the rear surface of the front lid section 23a. The front housing recessed section 25a is opened rearward and houses the bearing 52. The front insert-through hole section 25b pierces through the bottom surface of the front housing recessed section 25a to the front surface of the front lid section 23a. The front insert-through hole section 25b centers on the center axis AX. The inner diameter of the front insert-through hole section 25b is smaller than the inner diameter of the front housing recessed section 25a.

The front cylinder section 23b projects rearward from the outer circumferential edge portion of the front lid section 23a. The rear end portion of the front cylinder section 23b is in contact with the front end portion of the first housing 21. An O ring is disposed between the rear end portion of the front cylinder section 23b and the front end portion of the first housing 21.

The housing 20 further includes a first lid member 28a configured to close a portion other than a portion through which a power cable 73b explained below is inserted in the first housing hole section 27. The first lid member 28a is a tabular member, a plate surface of which is orthogonal to the up-down direction. As shown in FIG. 1, a shape of the first lid member 28a viewed from above is a substantially circular shape as a whole. A hollow section 28c hollowing forward is formed at the rear end portion of the first lid member 28a. The first lid member 28a is fit in the groove for fixing 27a. The first lid member 28a is fixed to the groove bottom surface of the groove for fixing 27a via, for example, an adhesive.

The housing 20 further includes, as shown in FIG. 2, a second lid member 28b configured to close the second housing hole section 29. The second lid member 28b is fit in the groove for fixing 29a. The second lid member 28b is fixed to the groove bottom surface of the groove for fixing 29a via, for example, an adhesive. In this embodiment, the first lid member 28a and the second lid member 28b have the same shape.

The rotor 30 includes, as shown in FIG. 3, the shaft 31 and a magnet 32. The shaft 31 has a columnar shape centering on the center axis AX. The rear end portion of the shaft 31 projects to the outside of the housing 20 via the rear through-hole 24. The front end portion of the shaft 31 projects to the outside of the housing 20 via the front through-hole 25. The front end portion of the shaft 31 is an output section to which a driven section driven by the motor 10 is attached. The magnet 32 has a cylindrical shape extending in the front-rear direction. The magnet 32 is fixed to the outer circumferential surface of the shaft 31.

The stator 40 is disposed to be opposed to the rotor 30 via a gap in the radial direction of the shaft 31. The stator 40 surrounds the radially outward direction of the magnet 32. The stator 40 includes a stator core 41, an insulator 42, and a plurality of coils 43.

The stator core 41 is an annular member surrounding the radially outward direction of the magnet 32. The outer circumferential surface of the stator core 41 is fixed to the inner circumferential surface of the first housing 21. The insulator 42 is an insulative member mounted on the stator core 41. The plurality of coils 43 are mounted on the stator core 41 via the insulator 42. The plurality of coils 43 are disposed at equal intervals around the stator core 41 along the circumferential direction.

The mold section 44 is a resin portion that covers the periphery of the stator 40 excluding both end portions in the radial direction in the stator core 41. The stator 40 is embedded in the mold section 44. The mold section 44 has a substantially cylindrical shape extending in the front-rear direction.

The circuit board 45 is embedded in the mold section 44 behind the stator 40. The circuit board 45 has a plate shape, a plate surface of which is orthogonal to the front-rear direction. Although illustration is omitted, coil wires configuring the coils 43 are connected to the circuit board 45. The circuit board 45 includes a projecting section 45a projecting to the outside of the housing 20. The projecting section 45a projects upward from the rear cylinder section 22b of the second housing 22. A connection terminal section 45b is formed in the projecting section 45a. Electric power can be supplied to the coils 43 by connecting a power supply to the connection terminal section 45b.

In this embodiment, the bearings 51 and 52 are ball bearings. The bearings 51 and 52 rotatably support the shaft 31. The bearing 51 is housed in the rear housing recessed section 24a and is held by the second housing 22. The bearing 51 includes, as shown in FIG. 4, an inner ring 51a, an outer ring 51b, and a plurality of balls 51c. The inner ring 51a has a cylindrical shape centering on the center axis AX. The inner ring 51a is fit in the shaft 31. For example, the inner ring 51a is pressed into the shaft 31 and fixed.

The outer ring 51b is disposed in the radially outward direction of the inner ring 51a. The outer ring 51b has a cylindrical shape centering on the center axis AX. The outer ring 51b is fit in the rear housing recessed section 24a. For example, the outer ring 51b is loose-fit in the rear housing recessed section 24a. The outer circumferential surface of the outer ring 51b (the outer circumferential surface of the bearing 51) is fixed to the inner circumferential surface 24d of the rear housing recessed section 24a via the adhesive 80 injected into the groove 24e. The adhesive 80 is, for example, an anaerobic adhesive.

The plurality of balls 51c are disposed between the inner ring 51a and the outer ring 51b in the radial direction and couple the inner ring 51a and the outer ring 51b. The plurality of balls 51c are disposed along the circumferential direction. A web washer 53 is disposed behind the bearing 51. The web washer 53 is in contact with the bottom surface 24c of the rear housing recessed section 24a and the rear end portion of the outer ring 51b. The web washer 53 applies a pre-load to the outer ring 51b forward.

As shown in FIG. 3, the bearing 52 is housed in the front housing recessed section 25a and held by the third housing 23. The structure of the bearing 52 is the same as the structure of the bearing 51. A method of fixing the bearing 52 is the same as the method of fixing the bearing 51.

The detecting device 60 is disposed behind the second housing 22. The detecting device 60 detects a rotating position of the rotor 30. In this embodiment, the detecting device 60 is an optical detecting device. The detecting device 60 includes a section to be detected 62, a sensor section 61, and a case 63.

The section to be detected 62 is a disk-shaped member expanding in the radial direction. The section to be detected 62 is fixed to the shaft 31. More specifically, the section to be detected 62 is fixed to the rear end portion of the shaft 31 by a screw 64. Although illustration is omitted, a reflecting section that reflects light and a non-reflecting section that does not reflect light are provided on the rear surface of the section to be detected 62. The non-reflecting section is, for example, a plurality of slits piercing through the section to be detected 62 in the front-rear direction.

The sensor section 61 is disposed behind the section to be detected 62. The sensor section 61 is fixed to the rear surface of the second housing 22. Although illustration is omitted, the sensor section 61 includes a light source section configured to irradiate light on the section to be detected 62 and a light receiving section configured to detect the light reflected by the reflecting section in the section to be detected 62. A portion of the section to be detected 62 on which the light from the light source section is irradiated changes between the reflecting section and the non-reflecting section according to rotation of the section to be detected 62 that rotates together with the shaft 31. Consequently, the sensor section 61 is capable of detecting a rotating position of the section to be detected 62 by detecting the light with the light receiving section. Therefore, the detecting device 60 can detect a rotating position of the rotor 30 that rotates together with the section to be detected 62.

The case 63 is a square cylindrical member opened forward and including a bottom section rearward. The case 63 covers the rear and the radially outward direction of the sensor section 61. The front end portion of the case 63 is fixed to the rear lid section 22a in the second housing 22. The case 63 configures a part of the outer shell of the motor 10 in conjunction with the housing 20.

The brake device 70 is capable of braking rotation of the shaft 31. In this embodiment, the brake device 70 is, for example, an electromagnetic brake. The brake device 70 is disposed in the radially inward direction of the rear cylinder section 22b in the second housing 22 behind the stator 40. The brake device 70 includes a first clamping member 71 and a second clamping member 72, a member to be clamped 74, a first screw member (a first fixing member) 75, a second screw member (a second fixing member) 76, and a driving section 73.

The first clamping member 71 and the second clamping member 72 are annular members centering on the center axis AX. The first clamping member 71 and the second clamping member 72 are disposed side by side in the front-rear direction. The first clamping member 71 and the second clamping member 72 surround the shaft 31 from the radially outward direction.

The first clamping member 71 includes, as shown in FIG. 7, a first base 71a and a first contact section (a contact section) 71b. The first base 71a has an annular plate shape centering on the center axis AX, a plate surface of which is orthogonal to the front-rear direction. The first base 71a surrounds a fixed cylinder section 74a explained below in the member to be clamped 74 from the radially outward direction. The first contact section 71b projects rearward from the rear surface of the first base 71a. The first contact section 71b has an annular shape centering on the center axis AX. In this embodiment, the position of the first clamping member 71 is fixed with respect to the driving section 73.

The second clamping member 72 is disposed behind the first clamping member 71. The second clamping member 72 includes a second base 72a and a second contact section (a contact section) 72b. The second base 72a has an annular plate shape centering on the center axis AX, a plate surface of which is orthogonal to the front-rear direction. The second base 72a surrounds the shaft 31 from the radially outward direction behind the member to be clamped 74. The second contact section 72b projects forward from the front surface of the second base 72a. The second contact section 72b has an annular shape centering on the center axis AX. The first contact section 71b of the first clamping member 71 and the second contact section 72b of the second clamping member 72 are disposed in positions overlapping each other when viewed along the front-rear direction. In this embodiment, the second clamping member 72 is movable in the front-rear direction with respect to the driving section 73.

The member to be clamped 74 is fixed to the shaft 31. The member to be clamped 74 includes, as shown in FIG. 7, a fixed cylinder section 74a and a disk section 74b. The fixed cylinder section 74a has a cylindrical shape extending in the front-rear direction centering on the center axis AX. The fixed cylinder section 74a extends from the front to the rear of the first base 71a of the first clamping member 71. The fixed cylinder section 74a is fit in the shaft 31 from the radially outward direction. The fixed cylinder section 74a is loose-fit in the shaft 31.

In the fixed cylinder section 74a, a female screw hole 74c piercing through a wall section the fixed cylinder section 74a in the radial direction is formed. In a rotating position (a predetermined position) of the shaft 31 shown in FIGS. 1 to 3, the female screw hole 74c pierces through a wall section of the fixed cylinder section 74a in the up-down direction. The first screw member 75 is screwed in the female screw hole 74c. The first screw member 75 is a slotted set screw including a hexagonal hole 75a. The end portion in the radially inward direction of the first screw member 75 is pressed against the outer circumferential surface of the shaft 31 and fixed. Consequently, the first screw member 75 fixes the member to be clamped 74 to the shaft 31.

When the rotating position of the shaft 31 is the predetermined position (e.g., the position shown in FIGS. 1 to 3), the first screw member 75 is opposed to the first housing hole section 27 in the radial direction (the first radial direction). When the rotating position of the shaft 31 is the predetermined position, the first screw member 75 overlaps the first housing hole section 27 when viewed along the direction in which the first housing hole section 27 pierces through the housing 20 (the first radial direction). In a state in which the first lid member 28a is not attached, when the rotating position of the shaft 31 is the predetermined position, the first screw member 75 is exposed to the outside of the housing 20 via the first housing hole section 27. As shown in the sectional view of FIG. 5, the first housing hole section 27 is a hole section expanding in the front-rear direction from the first screw member 75.

In the fixed cylinder section 74a, as shown in FIG. 6, a female screw hole 74d piercing through the wall section of the fixed cylinder section 74a in the radial direction is formed. In the rotating position (the predetermined position) of the shaft 31 shown in FIGS. 1 to 3, the female screw hole 74d pierces through the wall section of the fixed cylinder section 74a in the left-right direction. The direction in which the female screw section 73c pierces through the wall section of the fixed cylinder section 74a and the direction in which the female screw hole 74d pierces through the wall section of the fixed cylinder section 74a are orthogonal to each other. The second screw member 76 is screwed in the female screw hole 74d. In this embodiment, the second screw member 76 is the same screw as the first screw member 75 and is a slotted set screw including a hexagonal hole. The end portion in the radially inward direction of the second screw member 76 is pressed against the outer circumferential surface of the shaft 31 and fixed. Consequently, the second screw member 76 fixes the member to be clamped 74 to the shaft 31.

When the rotating position of the shaft 31 is the predetermined position (e.g., the position shown in FIGS. 1 to 3), the second screw member 76 is opposed to the second housing hole section 29 in the radial direction (the second radial direction). When the rotating position of the shaft 31 is the predetermined position, the second screw member 76 overlaps the second housing hole section 29 when viewed along the direction in which the second housing hole section pierces through the housing 20 (the second radial direction). In a state in which the second lid member 28*b* is not attached, when the rotating position of the shaft 31 is the predetermined position, the second screw member 76 is exposed to the outside of the housing 20 via the second housing hole section 29.

As shown in FIG. 7, the disk section 74*b* projects from the rear end portion of the fixed cylinder section 74*a* to the radially outward direction. The disk section 74*b* has an annular plate shape centering on the center axis, a plate surface of which is orthogonal to the front-rear direction. A radial direction outer portion of the disk section 74*b* is disposed between the first contact section 71*b* of the first clamping member 71 and the second contact section 72*b* of the second clamping member 72 in the front-rear direction. Consequently, at least a part of the member to be clamped 74 is disposed between the first clamping member 71 and the second clamping member 72 in the front-rear direction.

The driving section 73 is disposed behind the second clamping member 72. As shown in FIG. 3, the rear end portion of the driving section 73 is supported by the rear lid section 22*a* from the rear. The driving section 73 includes a solenoid 73*a* and a power cable 73*b*. The solenoid 73*a* is wound in the circumferential direction in the radially outward direction of the shaft 31.

The power cable 73*b* is connected to the solenoid 73*a*. The power cable 73*b* extends upward from the solenoid 73*a*. The power cable 73*b* is drawn out to the outside of the housing 20 via the first housing hole section 27 and the inside of the hollow section 28*c* of the first lid member 28*a*. A portion drawn out to the outside of the housing 20 in the power cable 73*b* is fixed to the housing 20 by a potting material 81. The potting material 81 is provided across a root portion of the portion drawn out to the outside of the housing 20 in the power cable 73*b*, the first lid member 28*a*, and the rear cylinder section 22*b* of the second housing 22 and fixes these portions to one another.

The potting material 81 closes the portion through which the power cable 73*b* is inserted in the first housing hole section 27. The potting material 81 is configured by, for example, an adhesive of a type different from the adhesive 80. In FIG. 3, the potting material 81 has, for example, a truncated cone shape.

The driving section 73 moves at least one of the first clamping member 71 and the second clamping member 72 in the front-rear direction. In this embodiment, the driving section moves the second clamping member 72 in the front-rear direction. The driving section 73 is capable of switching a state of the brake device 70 to a braking state and a non-braking state by moving the second clamping member 72.

The braking state is a state in which the rotation of the shaft 31 is braked. The first contact section 71*b* of the first clamping member 71 comes into contact with the front surface of the disk section 74*b* (the member to be clamped 74) in the braking state. The second contact section 72*b* of the second clamping member 72 comes into contact with the rear surface of the disk section 74*b* (the member to be clamped 74) in the braking state. That is, the first contact section 71*b* and the second contact section 72*b* come into contact with the member to be clamped 74 and clamp the member to be clamped 74 in the front-rear direction in the braking state. When the contact sections come into contact with the member to be clamped 74, a frictional force in the circumferential direction is generated between the first and second clamping members 71 and 72 and the member to be clamped 74. Rotation of the member to be clamped 74 can be braked. Therefore, in the braking state, the brake device 70 can brake the rotation of the shaft 31 to which the member to be clamped 74 is fixed.

The non-braking state is a state in which the rotation of the shaft 31 is not braked. The first contact section 71*b* of the first clamping member 71 is opposed to the disk section 74*b* (the member to be clamped 74) in the front-rear direction with a gap S1 therebetween in the non-braking state. The second contact section 72*b* of the second clamping member 72 is opposed to the disk section 74*b* (the member to be clamped 74) with a gap S2 therebetween in the non-braking state. In this way, in the non-braking state, the first clamping member 71 and the second clamping member 72 do not come into contact with the member to be clamped 74. Therefore, the rotation of the shaft 31 is not braked.

As shown in FIG. 5, a part of the gap S1 between the first contact section 71*b* and the member to be clamped and a part of the gap S2 between the second contact section 72*b* and the member to be clamped 74 are opposed to the first housing hole section 27 in the radial direction (the first radial direction) in the non-braking state. A part of the gap S1 and a part of the gap S2 are exposed to the outside of the housing 20 via the first housing hole section 27 in a state in which the first lid member 28*a* is not attached.

As shown in FIG. 6, a part of the gap S1 between the first contact section 71*b* and the member to be clamped and a part of the gap S2 between the second contact section 72*b* and the member to be clamped 74 are opposed to the second housing hole section 29 in the radial direction (the second radial direction) in the non-braking state. A part of the gap S1 and a part of the gap S2 are exposed to the outside of the housing 20 via the second housing hole section 29 in a state in which the second lid member 28*b* is not attached.

In FIGS. 5 and 6, the non-braking state is shown. The driving section 73 can switch the brake device 70 to the braking state by moving the second clamping member 72 forward from the non-braking state shown in FIGS. 5 and 6. In this embodiment, the brake device 70 changes to the non-braking state in a state in which electric power is not supplied to the driving section 73. The brake device 70 changes to the braking state in a state in which electric power is supplied to the driving section 73. That is, the second clamping member 72 moves forward when electric power is supplied to the driving section 73.

Although illustration is omitted, the brake device 70 includes an elastic member configured to push the second clamping member 72 rearward. When electric power is supplied to the driving section 73, the driving section 73 moves the second clamping member 72 forward resisting an elastic force of the elastic member and switches the brake device 70 to the braking state. On the other hand, when the supply of electric power to the driving section 73 is stopped, the second clamping member 72 moves rearward with the elastic force of the elastic member. The brake device 70 changes to the non-braking state.

A method of adjusting the position of the member to be clamped 74 with respect to the clamping members in the brake device 70 is explained. First, an operator sets the brake device 70 in the non-braking state and, as shown in FIG. 7, inserts an adjusting member B into the inside of the housing 20 via the first housing hole section 27. The operator inserts the adjusting member B into the gap S1 between the first clamping member 71 and the member to be clamped 74. The adjusting member B has a plate shape, a plate surface of which is orthogonal to the front-rear direction. Similarly, the operator inserts the adjusting member B into the gap S1 from the second housing hole section 29 as well.

The operator adjusts a position in the front-rear direction of the member to be clamped 74 to a position where the front surface of the adjusting member B comes into contact with the rear surface of the first contact section 71b and the front surface in the disk section 74b of the member to be clamped 74 comes into contact with the rear surface of the adjusting member B. A plate thickness (a dimension in the front-rear direction) of the adjusting member B is a dimension in the front-rear direction of the gap S1 necessary in the non-braking state. Therefore, by adjusting the position in the front-rear direction of the member to be clamped 74 as explained above, the gap S1 in the non-braking state can be set to a suitable dimension. The member to be clamped 74 can be positioned in the front-rear direction with respect to the clamping members.

Subsequently, the operator inserts a wrench L into the inside of the housing 20 via the first housing hole section 27. The operator inserts the wrench L into the hexagonal hole 75a of the first screw member 75 and tightens the first screw member 75. Similarly, the operator inserts the wrench L into the hexagonal hole of the second screw member 76 via the second housing hole section 29 and tightens the second screw member 76. Consequently, the operator can fix the member to be clamped 74 to the shaft with the first screw member 75 and the second screw member 76 in a state in which the position of the member to be clamped 74 with respect to the clamping members is adjusted in the non-braking state.

A method of fixing the bearing 51 is explained. When fixing the bearing 51, the operator inserts a dispenser into the injection hole section 26 from the first opening section 26a in a state in which the bearing 51 is fit in the rear housing recessed section 24a and injects the unhardened adhesive 80 into the groove 24e opened to the injection hole section 26. The unhardened adhesive 80 injected into the groove 24e is filled in the entire annular groove 24e by, for example, the capillary phenomenon. When the unhardened adhesive 80 hardens, the outer circumferential surface of the outer ring 51b in the bearing 51 is fixed to the inner circumferential surface 24d of the rear housing recessed section 24a by the adhesive 80. Consequently, the operator can fix the bearing 51 to the second housing 22.

According to this embodiment, a part of the gap S1 between the first contact section 71b and the member to be clamped 74 is opposed to the first housing hole section 27 in the radial direction (the first radial direction) in the non-braking state. When the rotating position of the shaft 31 is the predetermined position, the first screw member 75 is opposed to the first housing hole section 27 in the radial direction (the first radial direction). Therefore, in a state in which the first housing hole section 27 is not closed, the gap S1 and the first screw member 75 are exposed to the outside of the housing 20 via the first housing hole section 27. Consequently, as explained above, in a state in which the brake device 70 is housed in the housing 20, position adjustment of the member to be clamped 74 with respect to the clamping members can be performed via the first housing hole section 27.

The power cable 73b of the brake device 70 is drawn out to the outside of the housing 20 via the first housing hole section 27. That is, it is unnecessary to respectively provide a hole section for performing position adjustment of the brake device 70 and a hole section for drawing out the power cable 73b. By providing one first housing hole section 27, both of the position adjustment of the brake device 70 and the draw-out of the power cable 73b to the outside of the housing 20 can be performed. Therefore, the number of hole sections provided in the housing 20 can be reduced. Manufacturing of the housing 20 can be facilitated. Consequently, according to this embodiment, it is possible to obtain the motor 10 including the brake device 70 that needs to perform the position adjustment of the member to be clamped 74 with respect to the first clamping member 71 and the second clamping member 72 and having a structure that can reduce labor and time for manufacturing the housing 20.

Since the labor and time for manufacturing the housing 20 can be reduced, the manufacturing cost of the motor 10 can be reduced. Since the number of hole sections provided in the housing 20 can be reduced, the strength of the housing 20 can be prevented from decreasing. Since the position adjustment of the brake device 70 is performed, when the brake device 70 is in the non-braking state, the clamping members and the member to be clamped 74 can be prevented from coming into contact. Therefore, the clamping members and the member to be clamped 74 can be prevented from rubbing to be worn in the non-braking state. Therefore, the life of the brake device 70 can be improved. The life of the motor 10 can be improved. Rotation of the motor 10 can be prevented from being hindered in the non-braking state.

According to this embodiment, the second housing hole section 29 to which a part of the gap S1 between the first contact section 71b and the member to be clamped 74 is opposed in the radial direction (the second radial direction) in the non-braking state is formed. Therefore, the adjusting member B can be inserted into the gap S1 via the second housing hole section 29 as well. Consequently, the gap S1 can be adjusted using two adjusting members B. The adjustment of the gap S1 can be more stably performed. When the rotating position of the shaft 31 is the predetermined position, the second screw member 76 is opposed to the second housing hole section 29 in the radial direction (the second radial direction). Consequently, it is possible to fix two parts of the member to be clamped 74 with the first screw member 75 and the second screw member 76 while keeping the rotating position of the shaft 31 in the predetermined position without changing the rotating position. Therefore, the member to be clamped 74 can be more firmly and easily fixed to the shaft 31.

According to this embodiment, the first lid member 28a that closes the portion other than the portion through which the power cable 73b is inserted in the first housing hole section 27 and the second lid member 28b that closes the second housing hole section 29 have the same shape. Therefore, both of the first lid member 28a and the second lid member 28b can be obtained by manufacturing two lid members having one kind of a shape. Therefore, types of components configuring the motor 10 can be prevented from increasing and the manufacturing cost of the motor 10 can be prevented from increasing.

In this embodiment, the power cable 73b is not inserted through the second housing hole section 29 unlike the first housing hole section 27. Therefore, it is unnecessary to provide, in the second housing hole section 29, a portion through which the power cable 73b is inserted. Consequently, the opening area of the second housing hole section 29 can be set smaller than the opening area of the first housing hole section 27 as in this embodiment. Therefore, the strength of the housing 20 can be prevented from decreasing. An area of the groove bottom surface of the groove for fixing 29a formed in the circumferential edge portion of the second housing hole section 29 can be increased. The second lid member 28b can be more firmly fixed.

According to this embodiment, the first radial direction in which the first housing hole section 27 pierces through the wall section of the housing 20 and the second radial direction in which the second housing hole section 29 pierces through the wall section of the housing 20 are directions orthogonal to each other. Therefore, it is easy to separate, to a certain degree in the circumferential direction, a position where the two adjusting members B are inserted and a position of the shaft 31 where the member to be clamped 74 is fixed by the screw members. It is easy to stably perform position adjusting work for the brake device 70. The member to be clamped 74 can be more stably fixed to the shaft 31. For example, by setting the motor 10 using a surface on which the housing hole sections are not provided as a setting surface as in the posture shown in FIGS. 1 to 3, it is possible to perform the position adjusting work for the brake device 70 via the first housing hole section 27 and the second housing hole section 29 from above and one direction in the left-right direction without changing the posture of the motor 10. Consequently, the position adjusting work for the brake device 70 via the two housing hole sections can be easily performed.

According to this embodiment, the portion drawn out to the outside of the housing 20 in the power cable 73b is fixed to the housing 20 by the potting material 81. Therefore, for example, when the power cable 73b is connected to an external power supply, even if tensile stress is applied to the power cable 73b, the tensile stress can be prevented from being easily transmitted to a portion housed on the inside of the housing 20 in the power cable 73b. Consequently, the power cable 73b and the solenoid 73a can be prevented from being disconnected. The potting material 81 closes the portion through which the power cable 73b is inserted in the first housing hole section 27. Therefore, the first housing hole section 27 through which the power cable 73b is inserted can be accurately closed by the first lid member 28a and the potting material 81.

In this embodiment, the potting material 81 fixes the first lid member 28a and the second housing 22. Therefore, even if the opening area of the first housing hole section 27 is increased and the area of the groove bottom surface of the groove for fixing 27a decreases, the first lid member 28a can be firmly fixed to the second housing 22.

For example, when the first opening section 26a in the injection hole section 26 is opened in the rear surface of the second housing 22, when a part of the adhesive 80 injected between the inner circumferential surface 24d of the rear housing recessed section 24a and the outer circumferential surface of the bearing 51 does not harden, the unhardened adhesive 80 is likely to leak to the rear of the housing 20 and adhere to the detecting device 60. Therefore, a deficiency such as a failure of the detecting device 60 or deterioration in detection accuracy of the detecting device 60 is likely to occur.

On the other hand, according to this embodiment, the first opening section 26a of the injection hole section 26 is opened in the outer surface in the radial direction in the housing 20. Therefore, for example, even if the adhesive 80 leaks from the first opening section 26a when a part of the adhesive 80 injected between the inner circumferential surface 24d of the rear housing recessed section 24a and the outer circumferential surface of the bearing 51 does not harden, the unhardened adhesive 80 leaks in the radially outward direction of the housing 20 rather than to the rear of the housing 20. Consequently, the unhardened adhesive 80 can be prevented from adhering to the detecting device 60 disposed behind the housing 20. Therefore, a deficiency such as a failure of the detecting device 60 or deterioration in detection accuracy of the detecting device 60 can be prevented from occurring. It is possible to prevent the adhesion of the adhesive 80 to the detecting device 60 without providing a closing member for closing the injection hole section 26. Therefore, it is easy to reduce the number of components of the motor 10.

According to this embodiment, the injection hole section 26 linearly extends from the inside toward the outside in the radial direction. Therefore, it is easy to form the injection hole section 26. It is easy to insert a dispenser into the injection hole section 26. It is easy to inject the unhardened adhesive 80 into the groove 24e.

According to this embodiment, the direction in which the first housing hole section 27 is opened is the same direction as the direction in which the first opening section 26a of the injection hole section 26 is opened. Therefore, the position adjusting work for the brake device 70 via the first housing hole section 27 and fixing work for the bearing 51 via the injection hole section 26 can be performed from the same direction of the motor 10. Consequently, these kinds of work can be efficiently performed. Assemblability of the motor 10 can be improved.

When the detecting device 60 is the optical detecting device as in this embodiment, light emitted from the detecting device 60 is sometimes made incident on the adhesive 80 adhering to the section to be detected 62. In this case, a deficiency such as a change in the direction of the light reflected by the reflecting section of the section to be detected 62 or reflection of the light traveling to the non-reflecting section of the section to be detected 62 is likely to occur. Therefore, when the detecting device 60 is the optical detecting device, a deficiency easily occurs, in particular, in the detecting device 60 when the adhesive 80 adheres to the detecting device 60. Therefore, the effect of preventing the adhesive from adhering to the detecting device 60 can be particularly usefully obtained when the detecting device 60 is the optical detecting device.

When the adhesive 80 is the anaerobic adhesive as in this embodiment, the adhesive 80 filled in the portion of the groove 24e opened to the injection hole section 26 is considered to not harden because the adhesive 80 comes into contact with the atmosphere in the injection hole section 26. Therefore, when the adhesive 80 is the anaerobic adhesive, in particular, a part of the adhesive 80 easily leaks to the outside of the injection hole section 26 without hardening. Therefore, the effect of preventing the adhesive 80 from adhering to the detecting device 60 can be particularly usefully obtained when the adhesive 80 is the anaerobic adhesive.

Note that, in this embodiment, configurations explained below can also be adopted.

In the above explanation, the housing 20 is configured from the three separate members. However, the housing 20 is not limited to this and may be a single member. The shape of the first housing hole section 27 and the shape of the second housing hole section 29 are not particularly limited and may be shapes other than the shapes in the embodiment. When the shape of the first housing hole section 27 is formed in the circular shape as in the embodiment, the first housing hole section 27 is easily formed. The second housing hole section 29 may be provided, for example, on the lower surface of the housing 20. The second housing hole section 29 may not be provided. The first lid member 28*a* and the second lid member 28*b* may have different shapes.

Figure 8:
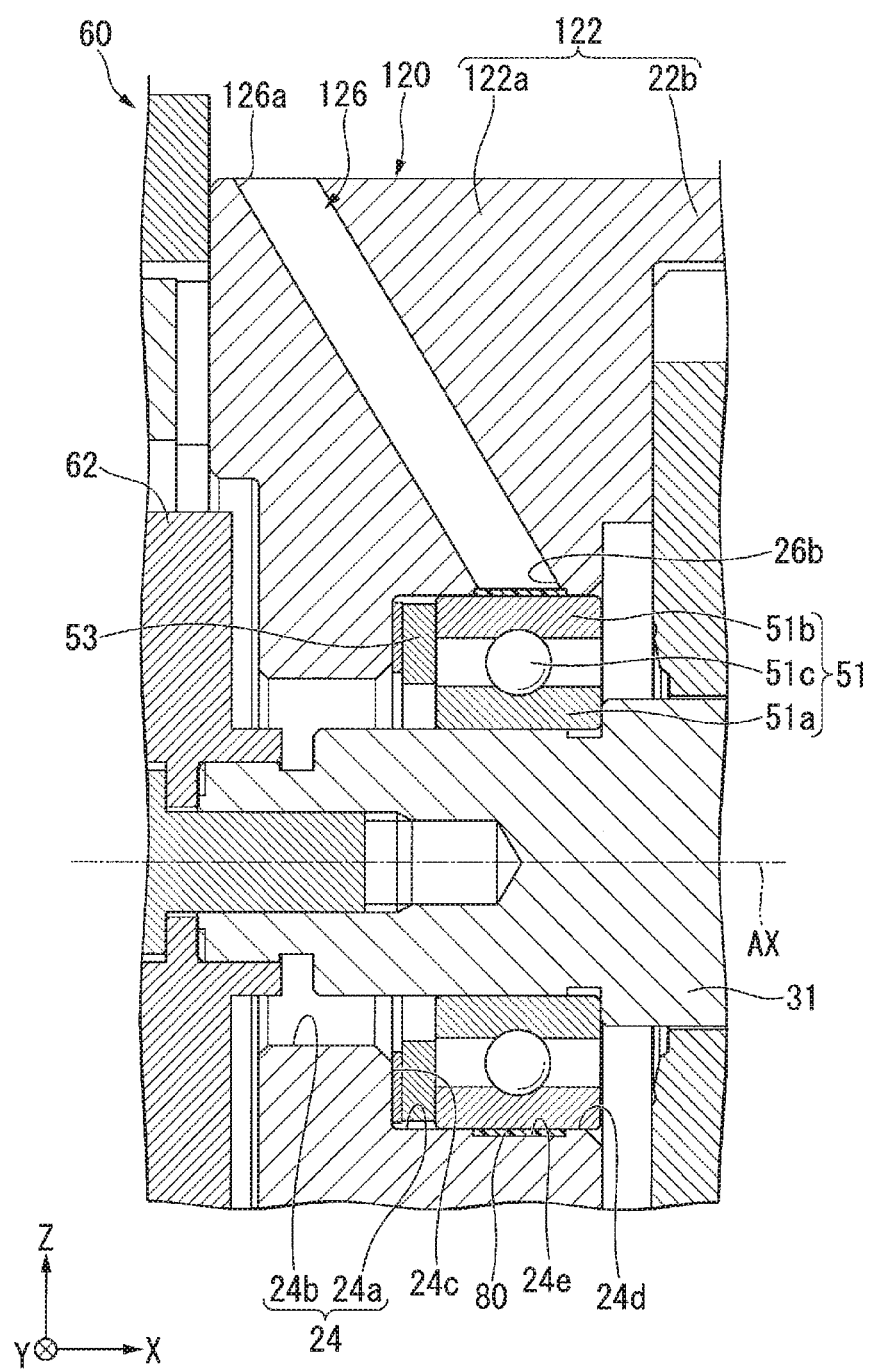
FIG. 8 is a sectional view of a part of a motor in another example of the embodiment.

The injection hole section 26 may have a shape of an injection hole section 126 shown in FIG. 8. FIG. 8 is a sectional view showing a part of a motor in another example of this embodiment. The injection hole section 126 is formed in a rear lid section 122*a* of a second housing (a holder) 122. A first opening section 126*a* of the injection hole section 126 is opened in the outer surface in the radial direction of a housing 120 behind the second opening section 26*b*. The injection hole section 126 tilts in a direction located further rearward from the inside toward the outside in the radial direction and linearly extends. With this configuration, the dimension in the front-rear direction of a portion further forward than the injection hole section 126 in the rear lid section 122*a* can be increased. The strength of the rear lid section 122*a* is easily increased. Consequently, the driving section 73 of the brake device 70 can be stably supported from the rear by the rear lid section 122*a*.

In the injection hole section 26, a closing member configured to close at least a part between the first opening section 26*a* and the second opening section 26*b* in the injection hole section 26 may be provided. For example, the closing member may be a screw member or may be a plug body other than the screw member. The closing member may close any position in the injection hole section 26. Specifically, the closing member may close an intermediate portion between the first opening section 26*a* and the second opening section 26*b* in the injection hole section 26, may close the first opening section 26*a*, may close the second opening section 26*b*, or may close the entire injection hole section 26. The number of the injection hole sections 26 is not particularly limited and may be two or more.

The bearings 51 and 52 may be a bearing other than the ball bearing such as a slide bearing. A type of the adhesive 80 for fixing the bearings 51 and 52 is not particularly limited and may be an adhesive other than the anaerobic adhesive. The detecting device 60 is not particularly limited if the detecting device 60 can detect the rotation of the rotor 30. The detecting device 60 may be a magnetic detecting device.

The driving section 73 of the brake device 70 only has to be able to move at least one of the first clamping member 71 and the second clamping member 72 in the front-rear direction and switch the braking state and the non-braking state. That is, the driving section 73 may move the second clamping member 72 or may move both of the first clamping member 71 and the second clamping member 72. At least a part of the gap S1 between the first contact section 71*b* of the first clamping member 71 and the member to be clamped 74 only has to be opposed to the first housing hole section 27 in the radial direction in the non-braking state. The same applies to the second housing hole section 29. In the embodiment, the immobile clamping member of the two clamping members is set as the first clamping member. However, a mobile clamping member of the two clamping members may be set as the first clamping member.

The first screw member 75 and the second screw member 76 may be screws other than slotted set screws or may be screws different from each other. In the embodiment, the fixing member for fixing the member to be clamped 74 is set as the screw member. However, the fixing member is not limited to this. The fixing member is not particularly limited and may be a member other than the screw member if the fixing member can fix the member to be clamped 74 to the shaft 31. The fixing member may be, for example, an adhesive.

Note that, in this specification, "the fixing member is opposed to the housing hole section in the radial direction" includes an indication that the fixing member is opposed to the housing hole section in the radial direction in a range in which the fixing member can be fixed to the shaft. That is, in the example in the embodiment, if the hexagonal hole 75*a* of the first screw member 75 is opposed to the first housing hole section 27 in the radial direction, the other portion of the first screw member 75 may not be opposed to the first housing hole section 27 in the radial direction.

Robot in the Embodiment

Figure 9:
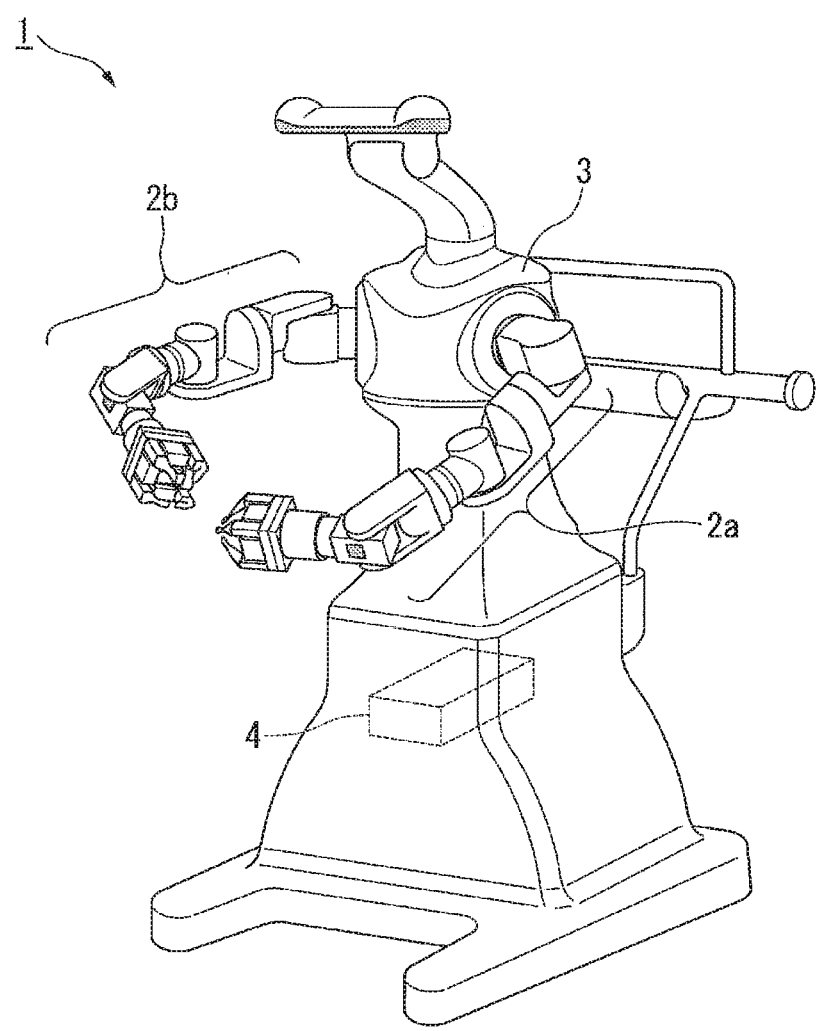
FIG. 9 is a perspective view of a robot in the embodiment.

FIG. 9 is a perspective view showing a robot 1, which is an example of a robot mounted with the motor 10 in the embodiment. The robot 1 is a double arm robot as shown in FIG. 9. The robot 1 includes a supporting stand 3, a first arm 2*a*, a second arm 2*b*, a control section 4, and a plurality of motors 10 not shown in FIG. 9. One ends of the first arm 2*a* and the second arm 2*b* are attached to the supporting stand 3. The first arm 2*a* and the second arm 2*b* respectively include pluralities of joints and movable sections coupled by the joints. The motors 10 are incorporated in the joints. The motors 10 drive the movable sections. The control section 4 is provided on the inside of the supporting stand 3. The control section 4 controls the operation of the robot 1.

According to this embodiment, the manufacturing cost of the motor 10 can be reduced as explained above. Therefore, the manufacturing cost of the robot 1 mounted with the motor 10 can be reduced. Further, the life of the motor 10 can be improved. Therefore, the robot 1 excellent in reliability can be obtained.

Note that the robot mounted with the motor 10 may be a robot other than the robot 1 and is not particularly limited. The robot mounted with the motor 10 may be a robot for ceiling suspension or a vertical articulated robot other than the robot for ceiling suspension, or a single-arm robot. A degree of freedom of the robot mounted with the motor 10 is not particularly limited.

Note that uses of the motor 10 are not particularly limited. The motor 10 may be mounted on apparatuses other than the robot. The components explained above can be combined as appropriate in a range in which the components are not contradictory to one another.

The entire disclosure of Japanese Patent Application No. 2017-219722, filed Nov. 15, 2017 is expressly incorporated by reference herein.

What is claimed is:

1. A motor comprising:
    a housing;
    a stator fixed to the housing and including a coil;
    a rotor including a shaft and configured to rotate relative to the stator around an axis extending in a predetermined direction; and
    a brake disposed in the housing apart from the stator in the predetermined direction and capable of braking rotation of the shaft, wherein
    the brake includes:
        a first clamp and a second clamp disposed side by side in the predetermined direction;
        a member to be clamped fixed to the shaft and disposed between the first clamp and the second clamp;

a first fixing member configured to fix the member to be clamped to the shaft; and a driving section configured to move at least one of the first clamp and the second clamp in the predetermined direction and bring the first clamp and the second clamp into contact with the member to be clamped, the first clamp includes a first contact section configured to come into contact with the member to be clamped, the second clamp includes a second contact section configured to come into contact with the member to be clamped, a first housing hole piercing through the housing in a first radial direction in a radial direction of the shaft is provided in the housing, the driving section includes a power cable drawn out to an outside of the housing via the first housing hole, and the first housing hole overlaps the first contact section of the first clamp, the second contact section of the second clamp, the member to be clamped, and the first fixing member in a plan view from the first radial direction, wherein the brake further includes a second fixing member configured to fix the member to be clamped to the shaft, a second housing hole piercing through the housing in a second radial direction in the radial direction is provided in the housing, and the second housing hole overlaps the first contact section of the first clamp, the second contact section of the second clamp, the member to be clamped, and the second fixing member in a plan view from the second radial direction.

2. The motor according to claim 1, wherein
the housing includes:
a first lid configured to close a portion other than a portion through which the power cable is inserted in the first housing hole; and
a second lid configured to close the second housing hole, and
the first lid and the second lid have a same shape.

3. The motor according to claim 1, wherein the first radial direction and the second radial direction are directions orthogonal to each other.

4. The motor according to claim 1, wherein
the housing includes a first lid configured to close a portion other than a portion through which the power cable is inserted in the first housing hole,
a portion drawn out to the outside of the housing in the power cable is fixed to the housing by a potting material, and
the potting material closes the portion through which the power cable is inserted in the first housing hole.

5. A robot comprising the motor according to claim 1.

6. A motor comprising:
a housing;
a stator fixed to the housing and including a coil;
a rotor including a shaft and configured to rotate relative to the stator around an axis extending in a predetermined direction;

a brake disposed in the housing apart from the stator in the redetermined direction and capable of braking rotation of the shaft;

a detector configured to detect a rotating position of the rotor;

a holder disposed between the stator and the detector in the predetermined direction; and a bearing held by the holder and configured to rotatably support the shaft, wherein the brake includes:
a first clamp and a second clamp disposed side by side in the predetermined direction;
a member to be clamped fixed to the shaft and disposed between the first clamp and the second clamp;
a first fixing member configured to fix the member to be clamped to the shaft; and
a driving section configured to move at least one of the first clamp and the second clamp in the predetermined direction and bring the first clamp and the second clamp into contact with the member to be clamped, the first clamp includes a first contact section configured to come into contact with the member to be clamped, the second clamp includes a second contact section configured to come into contact with the member to be clamped, a first housing hole piercing through the housing in a first radial direction in a radial direction of the shaft is provided in the housing, the driving section includes a power cable drawn out to an outside of the housing via the first housing hole, and the first housing hole overlaps the first contact section of the first clamp, the second contact section of the second clamp, the member to be clamped, and the first fixing member in a plan view from the first radial direction, wherein a recess opened toward the stator and configured to house the bearing and an injection hole including a first opening opened toward the outside of the housing, the injection hole communicating with the recess, are provided in the holder, a groove into which an adhesive is injected is provided on an inner surface of the recess, and an outer circumferential surface of the bearing is fixed to the inner surface via the adhesive, and the injection hole includes a second opening opened in an inner circumferential surface of the recess and connected to the groove.

7. The motor according to claim 6, wherein the injection hole linearly extends in the radial direction.

8. The motor according to claim 7, wherein the first opening of the injection hole is disposed further on the detector side in the predetermined direction than the second opening.

9. The motor according to claim 6, wherein a direction in which the first housing hole is opened and a direction in which the first opening is opened are a same direction in the radial direction.

* * * * *